United States Patent [19]

Chittineni

[11] Patent Number: 4,499,598
[45] Date of Patent: Feb. 12, 1985

[54] EDGE AND LINE DETECTION IN MULTIDIMENSIONAL NOISEY, IMAGERY DATA

[75] Inventor: Chittibabu Chittineni, Ponca City, Okla.

[73] Assignee: Conoco Inc., Ponca City, Okla.

[21] Appl. No.: 394,674

[22] Filed: Jul. 2, 1982

[51] Int. Cl.³ .............................................. G06K 9/56
[52] U.S. Cl. ........................................ 382/54; 382/22; 382/27
[58] Field of Search ....................... 382/21, 22, 27, 54; 358/282, 284

[56] References Cited

U.S. PATENT DOCUMENTS 3,609,685  9/1971  Deutsch ................................ 382/21
4,020,463  4/1977  Himmel ................................ 382/21

OTHER PUBLICATIONS

Holdermann et al., "Processing of Gray-Scale Pictures", *Computer Graphics and Image Processing*, vol. 1, No. 1, Apr. 1972, pp. 66-80.

Sakai et al., "Extraction of Invariant Picture Sub-Structures by Computer", *Comp. Graphics and Image Process*, vol. 1, No. 1, Apr. 1972, pp. 81-96.

*Primary Examiner*—Leo H. Boudreau
*Attorney, Agent, or Firm*—William J. Miller

[57] ABSTRACT

A machine process for identification and extraction of magnitude and direction of edges and lines in noisey multidimensional imagery data. A digital picture function is viewed as a sampling of the underlying reflectance function of the objects in the scene or pattern with noise added to the true function values. The edges or lines relate to those places in the image where there are jumps in the values of the function or its derivatives. By expressing the function in some parametric form, the edges or line may by inferred from the values of the parameters.

6 Claims, 16 Drawing Figures

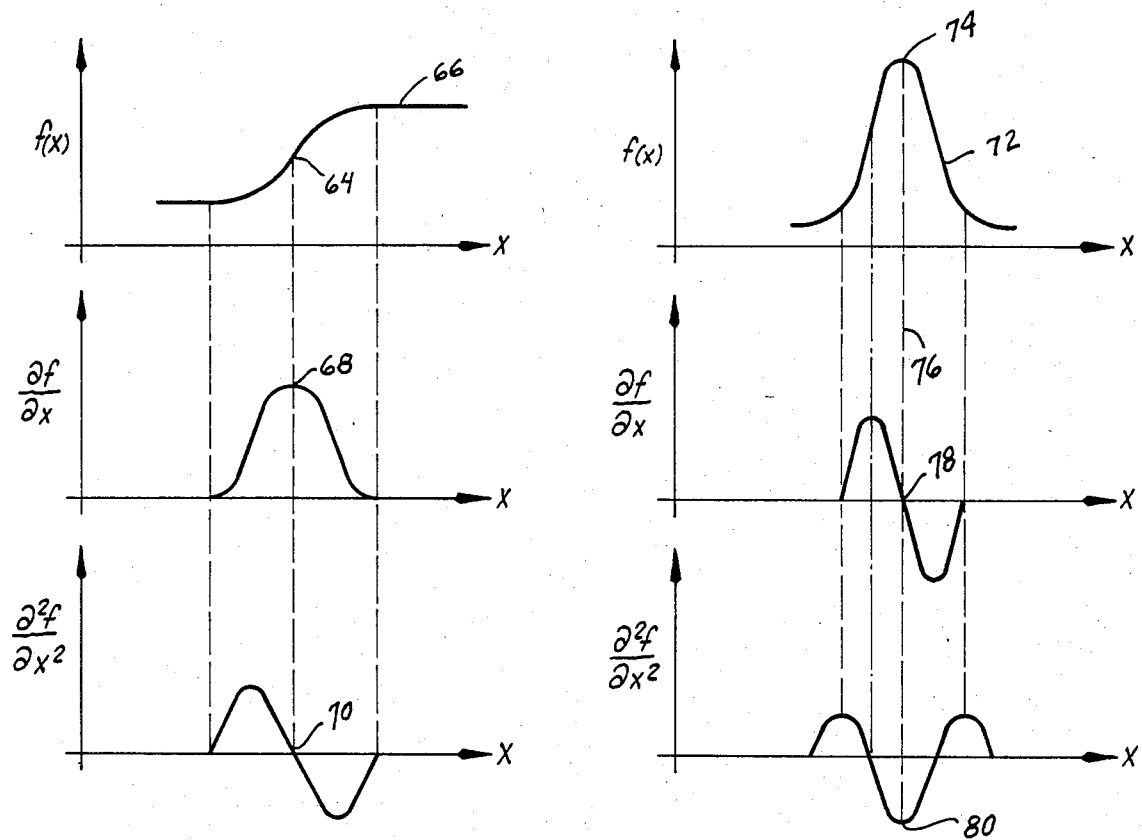
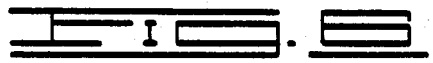   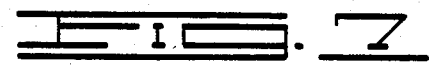
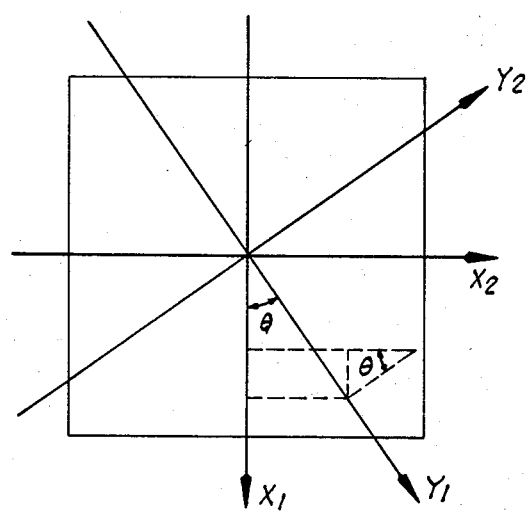
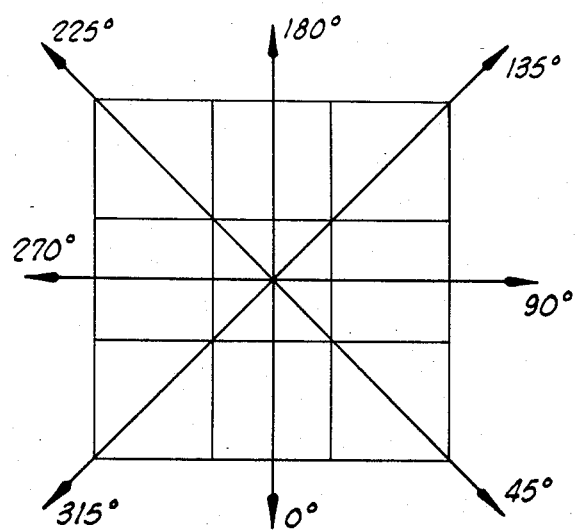
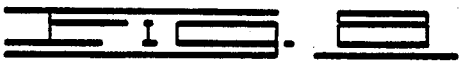   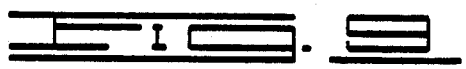

EDGE AND LINE DETECTION IN MULTIDIMENSIONAL NOISEY, IMAGERY DATA

BACKGROUND OF THE INVENTION

1. Field of the Invention

The invention relates generally to digital pattern recognition systems and, more particularly, but not by way of limitation, it relates to an improved form of pattern detection device for use with multidimensional data in the presence of noise.

2. Description of the Prior Art

Generally, the prior art has been limited to various forms of two-dimensional recognition process wherein digital image processing is carried out using flat or two-dimensional operators in processing a single image plane and the selection of thresholds is a difficult task at best. The prior art proposals employed a variety of operators for detection of edges and lines by fitting a surface to a picture function in the neighborhood of each image point and then taking the derivatives of the function at that point. The prior operators worked on single plane images and thereby required a very difficult and time consuming threshold selection procedure. Such prior art digital picture processing technique is disclosed by Prewitt in "Object Enhancement and Extraction in Picture Processing and Psycho Pictorics", Academic Press, New York, 1970, pp. 75, 149. More recently, Haralick introduced the noise term and devised statistical tests for the detection of significant edges by fitting a plane in the neighborhood of a point for a two-dimensional image, and this teaching is presented in "Edge and Region Analysis of Digital Image Data" as presented in Computer Graphics and Image Processing, Volume 12, 1980, PP. 60–73.

Several prior sources have treated the surface fitting using an orthogonal basis of two-dimensional functions, i.e. walsh functions, orthonormal fourier functions and orthogonal polynomials, and here again all of the operators work upon a two-dimensional plane or single band image. Still more recently, Morgenthaler and Rosenfeld generalized the aforementioned Prewitt operators to n-dimensions by fitting a hyperquadric surface. However, noise is not introduced into the formulation. The Morgenthaler and Rosenfeld teachings are presented in an article entitled "Multidimensional Edge Detection by Hypersurface Fitting", IEEE Transactions, Pattern Analysis and Machine Intelligence, July 1981, PP. 482-486.

In the patented prior art, some patents of general interest are as follows: Sternberg—U.S. Pat. No. 4,322,716; Golay—U.S. Pat. No. 4,060,713; and Kono—U.S. Pat. No. 4,110,736.

SUMMARY OF THE INVENTION

The present invention relates to digital machine processing to achieve identification and extraction of edges and lines and directional edges and lines in noisey multidimensional image data. The present invention differs from the prior techniques in that multidimensional operators and optimal statistical tests are developed for the extraction of significant edges and lines from multidimensional noisey data. The digital picture function is viewed as a sampling of the underlying reflectance function of the objects in the scene with noise added to the true function values. Thus, the edges or lines relate to places in the image where there are jumps in the values of the function or its derivatives. By expressing the function in some parametric form, the edges or lines are inferred from the values of the parameters. Multidimensional or multi-band data is input for subsequent processing through routines for effecting detection of edges and lines to develop data relating to the magnitude and the edge or line direction. Upon perfection of this data for a series of pixel evaluations constituting a full image scene, additional processing routines for smoothing, thinning and linking the data may be selectively called up for contribution to the final output display of the multidimensional data.

Therefore, it is an object of the present invention to identify and extract edges and lines in noisey, multidimensional image data, for example, the linear features in multi-band Landsat image data, three-D seismic horizon data and the like.

It is also an object of the invention to provide a digital machine process for evaluating multi-band geographic surveillance data to provide recognition of linears, lineaments, vegetation variations, and other multiple band reflectance parameters emanating from earth surface areas.

It is still further an object of this invention to provide a versatile machine processing program capable of processing a considerable plurality of simultaneous band or depth responses over selected, interconnected neighborhood image elements.

Finally, it is an object of the present invention to perform digital pattern recognition of multi-band data while eliminating the effects of noise present in the input data.

Other objects and advantages of the invention will be evident from the following detailed description when read in conjunction with the accompanying drawing which illustrate the invention.

BRIEF DESCRIPTION OF THE DRAWINGS

FIG. 5 is a flow diagram of the program utilized to effect the present invention;

FIG. 6 are a series of related graphs depicting a step edge and its derivatives;

FIG. 7 is a series of interconnected graphs illustrating a roof top edge or line and its derivatives;

FIG. 8 is a graphic view illustrating the basic and rotated coordinate systems employed in the present invention;

FIG. 9 is a graphic depiction illustrating the eight directions in which a direction of edge or line may be quantized;

FIG. 15 is a thinned and thresholded gradient magnitude image of the detected image of FIG. 14.

DETAILED DESCRIPTION OF THE INVENTION

Figure 1:
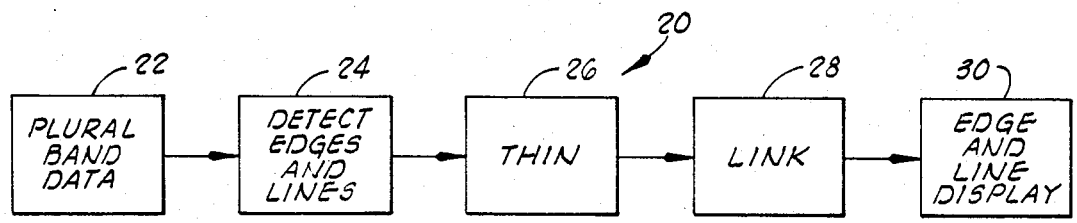
FIG. 1 is a block diagram illustrating the basic elements of the present edge and line detection system.

FIG. 1 illustrates the major system portions of a machine processing system 20 for edge and line detection in multidimensional noisey imagery data. The system 20 can be used for examinations of plural band input data of various types as is input in digitized form for storage at stage 22. Such plural band data may be any of the multi-band Landsat data images, three-dimensional seismic horizon data, or other forms of related data in a plurality of distinct band responses.

The multidimensional data input is applied in scan sequence through stage 24 which functions to detect edge and line data relative to the multidimensional images. System 20 next performs a trim stage 26 which may be followed by a link routine in stage 28 and, finally, output display 30 provides an edge and line display at selectively varied significance levels of the multi-band image data. The processing system 20 is the function of three programs and two sub routines, as presently constituted, which implement and control operation of a digital computer type VAX 11-780, as available from Digital Equipment Company.

The present invention is particularly described with respect to four-band Landsat data of the type acquired from the United States government in digital tape form for whatever the selected earth areas of interest; however, it should be understood that various types of multidimensional, related image data can be processed in like manner and the present invention is particularly adapted for picking selected linear horizons of three-dimensional seismic data. The display 30 is a conventional type of color video display that is compatible with the particular computer equipment. The video display is divided up into a pixel array, 512 pixels by 512 pixels, and this pixel field is equated to the image field of view in the $X_1$ and $X_2$ dimensions. Thus, FIG. 2 illustrates the three-dimensional coordinates as utilized in the present processing system with a 512×512 three-dimensional pixel array superimposed thereover, i.e. a 3-D image of size $m_1 \times m_2 \times N_3$.

Figures 2, 3:
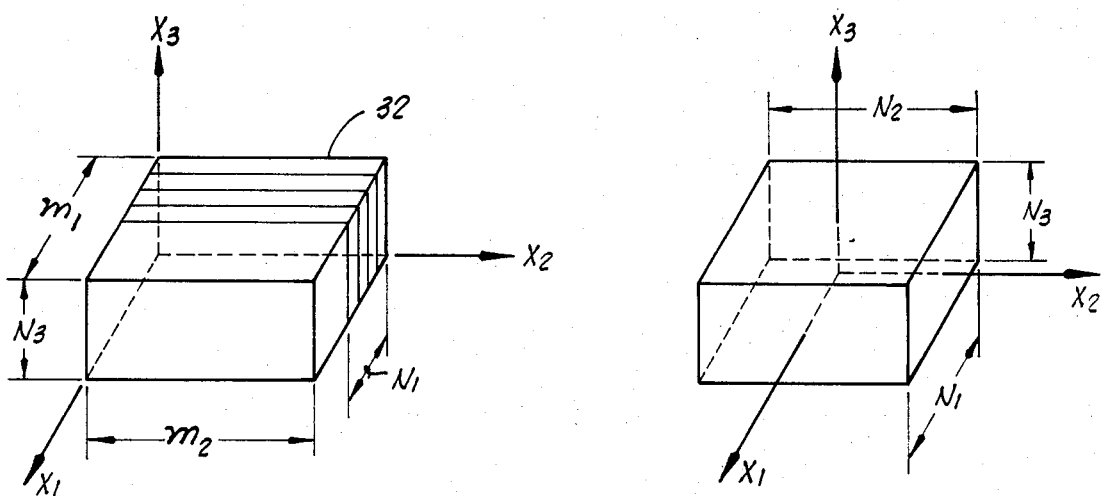
FIG. 2 is an idealized drawing of a three-dimensional image with size designations as utilized in the present invention.
FIG. 3 illustrates the local neighborhood of a pixel and the positioning of the coordinate system in the present invention.

FIG. 3 illustrates a local neighborhood of a pixel and its position relative to the coordinate system, such neighborhood being of a size $N_1 \times N_2 \times N_3$ as shown. Some typical dimensions as selected by the operator for implementation within the program of processing system 20 may be:

$m_1 = 512$
$m_2 = 512$
$N_3 = 4$
$N_1 = 3, 5, 7, 9, 11$
$N_2 = 3, 5, 7, 9, 11$.

Figure 4:
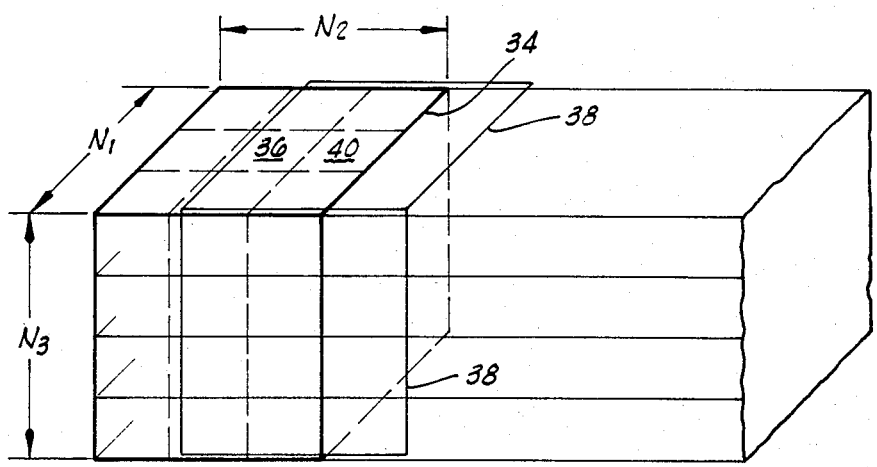
FIG. 4 is a view in perspective illustrating the manner in which the scanning of neighborhood pixels is effected.
Figure 3:
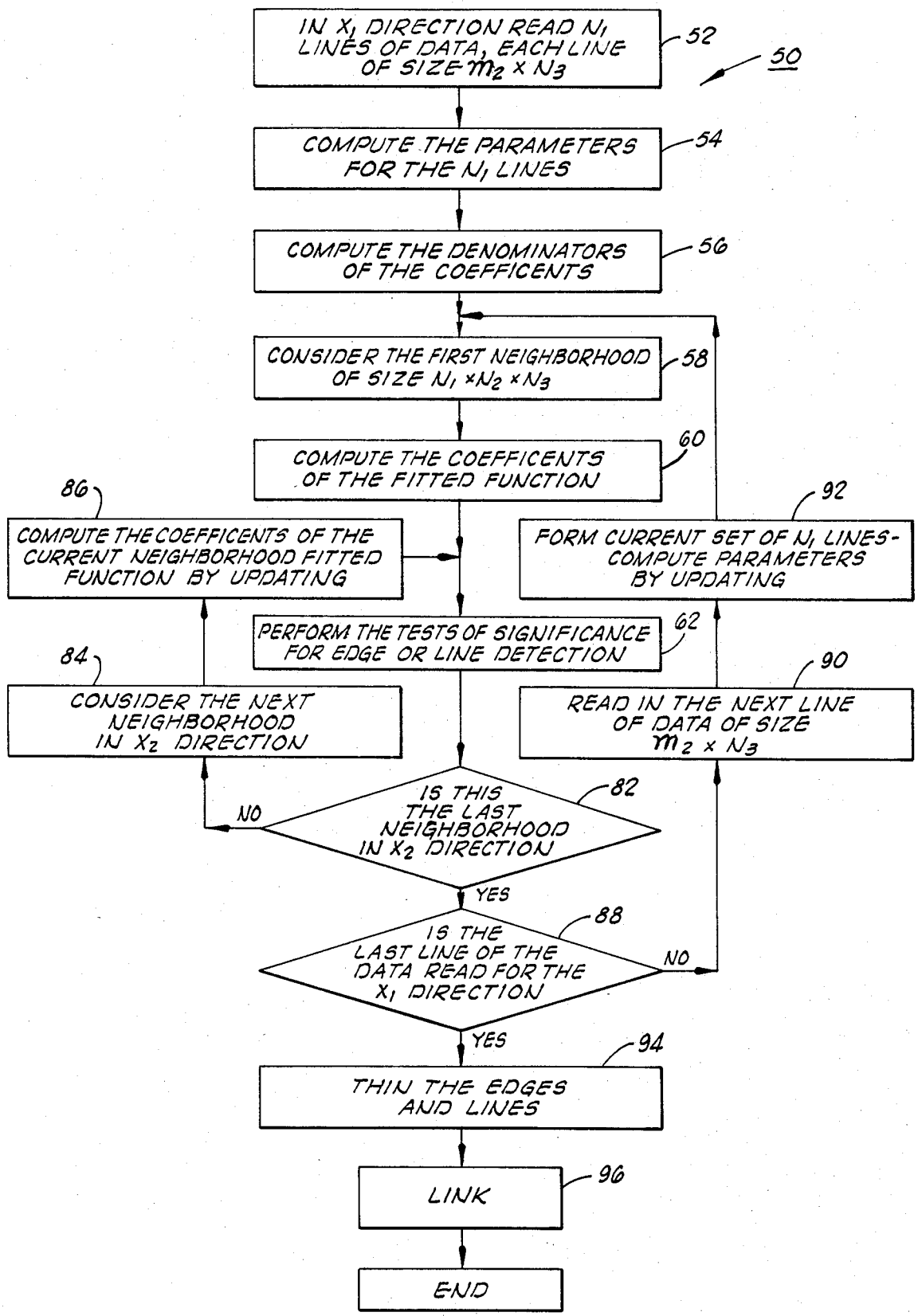
Figure 10:
FIG. 10 is a photograph of a Landsat, band 4, image.
Figure 11:
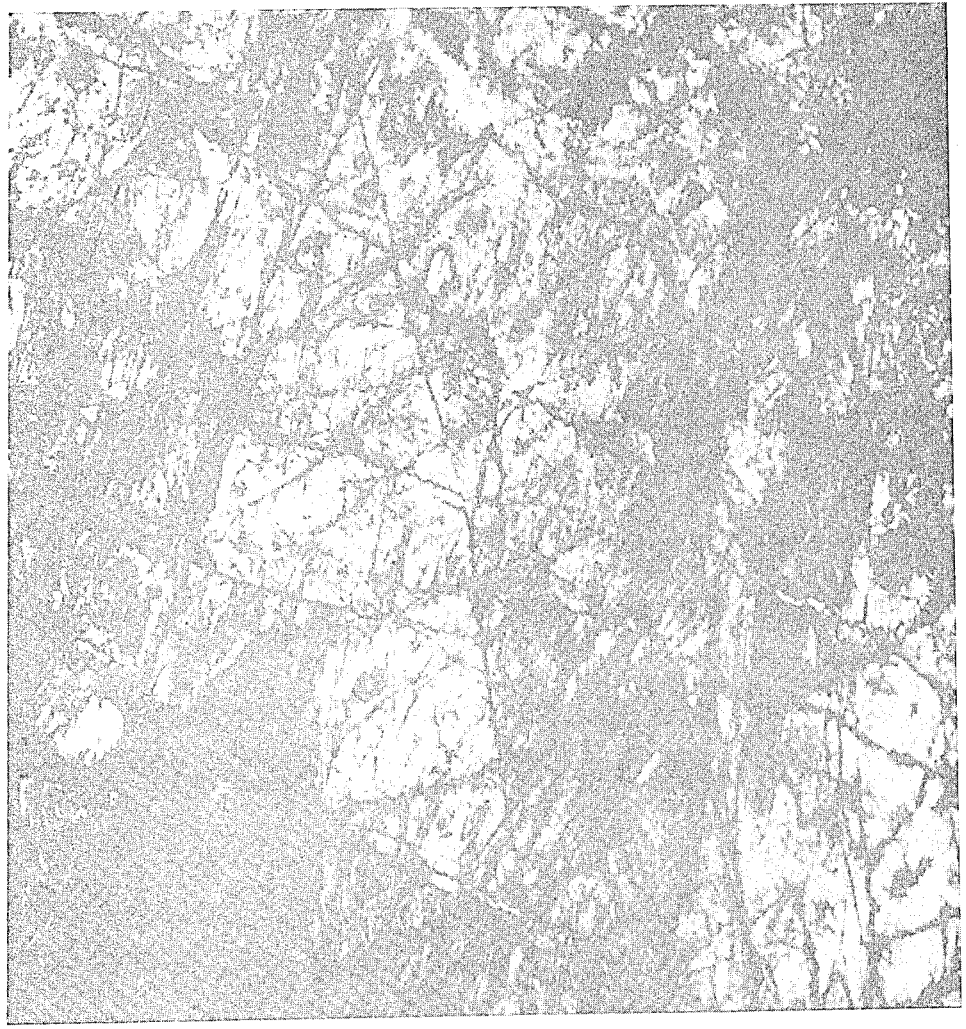
FIG. 11 is a photograph of a Landsat, band 5, image.
Figure 12:
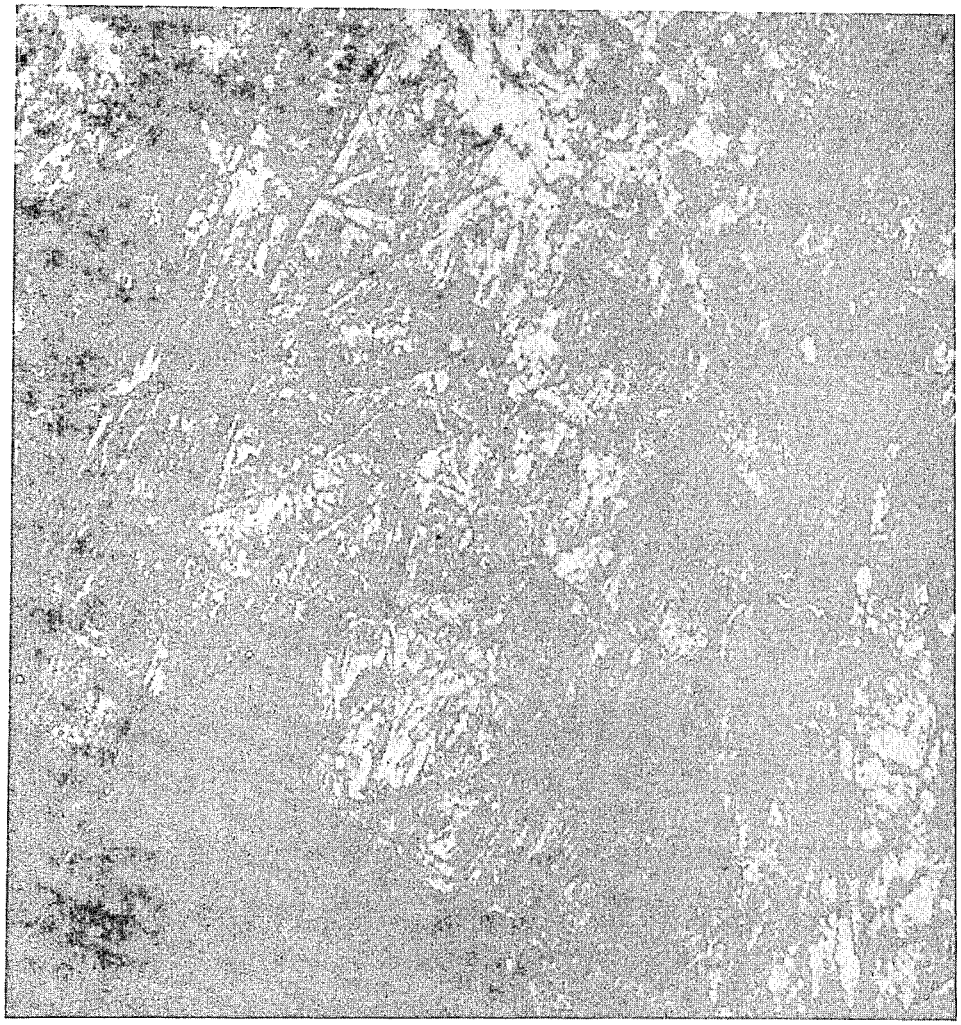
FIG. 12 is a photograph of a Landsat, band 6, image.
Figure 13:
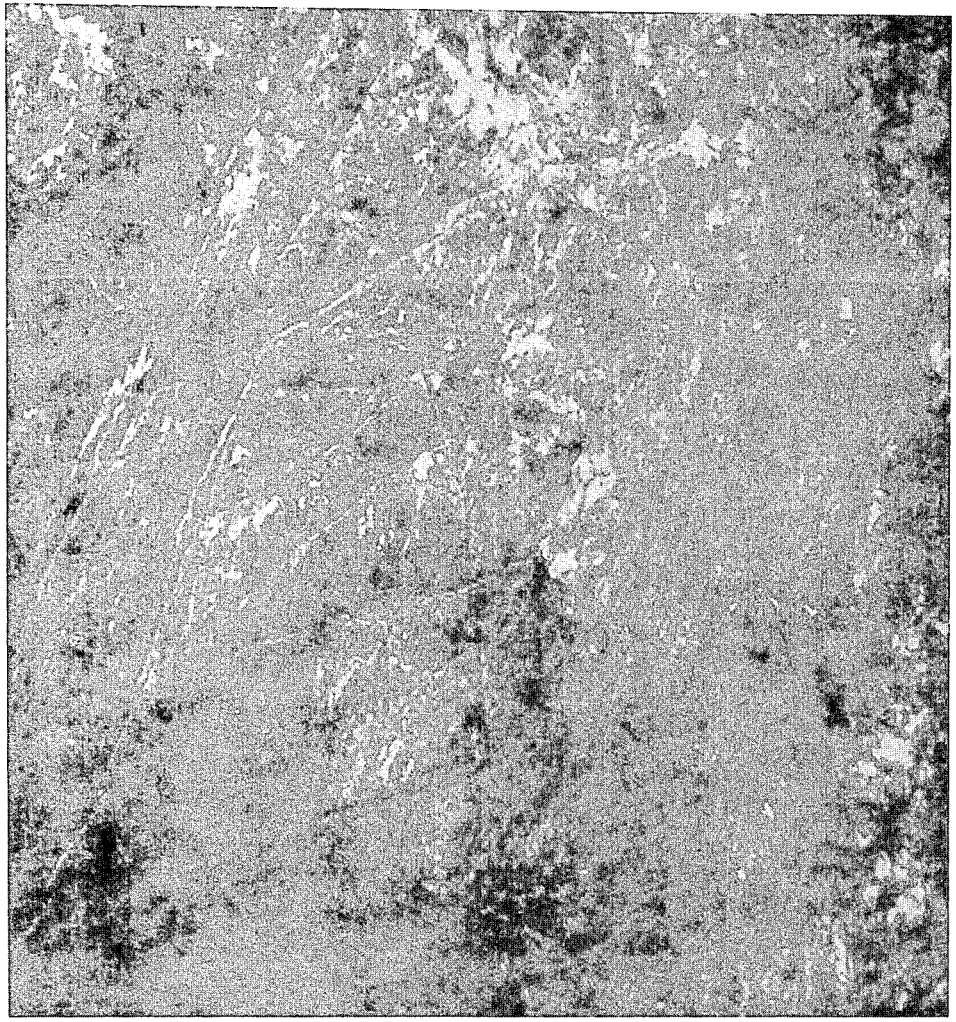
FIG. 13 is a photograph of a Landsat, band 7, image.

FIG. 4 illustrates the scanning procedure of pixel neighborhoods as it may be likened to scanning in the $X_2$ direction across the image block 32, i.e. from left to right, where $N_1 = 3$ and a 9 pixel neighborhood 34 is disposed around the central pixel 36. The neighborhood has a four pixel $N_3$ dimension along the $X_3$ axis as would be the case for four-band Landsat data. At completion of establishment of coefficients and requisite pixel data for pixel 36, the entire neighborhood 34 would shift rightward one pixel such that the next successive neighborhood would be shown by lines 38 surrounding central pixel 40. Such examination of all bands of data proceeds a pixel at a time rightward whereupon return to the left side of the $m_2$ dimension (see FIG. 2) would find the scan indexed one pixel in the $X_1$ direction for initiation of the next successive rightward scan of neighborhoods in the $N_2$ dimension.

The edges or lines refer to the places in the image where there are significant discontinuities in the values of the function or its derivatives. The existence of an edge or line at the point of the image is decided using information from the neighborhood for that point or pixel. Thus, hypersurfaces are fitted to the multidimensional picture function in the neighborhood of the pixel under consideration using discrete orthogonal polynomials as basis functions. Assuming the noise and the picture function is Gaussian and independent from pixel to pixel, the coefficients of the fitted surfaces are shown to be unbiased and expressions for their variances are obtained. The first and second derivatives of the fitted function evaluated at the pixel under consideration are used as edge and line detectors. Statistical hypothesis tests are devised for testing whether the computed gradient and Laplacian are significantly different from zero. These tests involve the computation of a variable having F-distribution in terms of the coefficients of the fitted surface, their variances and the error in the fit. The significant edges and lines are detected by comparing the computed variable with its critical value at a specified degree of confidence. If the value of the variable is greater than the critical value, the magnitude of the edge or line is taken to be the value of the variable. Otherwise, they are set to zero. Also, the direction of the edge or line is computed; and thus, for each point in the image, the magnitude and direction of the edge or line is computed.

For the detection of edges and lines at a particular orientation, the expressions are developed for the coefficients of the fitted surfaces and for their variances when the coordinate system is rotated by selected angle to that direction. Statistical tests are then carried out for the detection of significant edges and lines. Having observed that there is considerable redundancy in the computations for successive neighborhoods, the program utilizes recursive relationships in maintaining the coefficients of the fitted surfaces between successive neighborhoods.

In general, as a neighborhood moves along the direction of a gradient, the edge magnitude starts at a low value, reaches its maximum and drops off to a low value again. For detecting the edges at the peak of the edge profile, the processing system 20 uses a thinning program at stage 26 (FIG. 1) which program uses the magnitude and direction of the gradient at each point. The neighboring pixels along a direction normal to the direction of an edge are disqualified from being candidates for the edges if the following conditions are satisfied: (a) the magnitude of the gradient at a pixel is larger than the magnitudes of the gradients of its neighbors; and, (b) the direction of the gradients of the neighbors deviates by a small amount from the direction of the gradient of the pixel under consideration.

In some cases, the edges of certain linears sometimes get disconnected. In this case, the processing system 20 includes a smoothing sub-routine which may be optionally employed prior to the thinning routine of stage 26. The edge magnitude at the central pixel is replaced by the sum of that pixel and weighted average of its neighbors, or, a portion of the gradient of the central pixel is added to each neighborhood pixel gradient.

FIG. 5 illustrates a processing flow diagram 50 which illustrates the program and sub-routine functions in control of the processing system 20 to carry out the method of the present invention. Thus, the initial stage 52 controls read-in of $N_1$ lines of data in the $X_1$ direction, each of the lines of data being of a size $m_2 \times N_3$. This input data is then processed at flow step 54 to compute the parameters for the $N_1$ lines of data. For this operation, let $f(X_1, X_2, X_3)$ be the picture function values in the $N_1$ lines of data read where $1 \leq X_1 \leq N_1$, $1 \leq X_2 \leq m_2$, $1 \leq X_3 \leq N_3$. Let $\pi_3$ be the domain of $X_3$ and let $\pi_{13}$ be the domain of $X_1, X_3$. Then, for each $X_1, X_2$ compute the following over domain $\pi_3$ with the coordinate system position at the center of $\pi_3$ for every $X_1, X_2$.

Compute:

$$F_2(X_1, X_2, 1) = \Sigma_{\pi_3} f(X_1, X_2, X_3)$$

$$F_2(X_1, X_2, 2) = \Sigma_{\pi_3} f(X_1, X_2, X_3) X_3$$

$$F_2(X_1, X_2, 3) = \Sigma_{\pi_3} X_3^2 f(X_1, X_2, X_3) \quad (1)$$

For each $X_2$ compute the following over the domain $\pi_{13}$ with the coordinate system positioned at the center of $\pi_{13}$ for every $X_2$.

Compute:

$$F_1(X_2, 1) = \Sigma_{\pi_{13}} f(X_1, X_2, X_3)$$

$$F_1(X_2, 2) = \Sigma_{\pi_{13}} X_1 f(X_1, X_2, X_3)$$

$$F_1(X_2, 3) = \Sigma_{\pi_{13}} X_3 f(X_1, X_2, X_3)$$

$$F_1(X_2, 4) = \Sigma_{\pi_{13}} X_1^2 f(X_1, X_2, X_3)$$

$$F_1(X_2, 5) = \Sigma_{\pi_{13}} X_3^2 f(X_1, X_2, X_3)$$

$$F_1(X_2, 6) = \Sigma_{\pi_{13}} X_1 X_3 f(X_1, X_2, X_3) \quad (2)$$

The process flow then proceeds to stage 56 which commands computation of the denominators of the coefficients for the hyperquadric surface that will be fit to the image. Thus, let $X = (X_0, X_1, \ldots X_n)^T$ be a point in the n-dimensional space. Let $\pi_0$ be the hyperrectangular local neighborhood of its central pixel, the pixel that is under consideration. Let the coordinate system be positioned so that the center of the region is at the origin. Let $\{S_i(X), 0 \leq i \leq N\}$ be a set of orthogonal basis functions defined over the neighborhood $\pi_0$. Let $f(x)$ be the digital picture function and let $g(X)$ be an estimate $f(X)$, estimated as a weighted sum of basis functions. That is:

$$g(X) = \sum_{i=0}^{N} a_i S_i(X) \quad (3)$$

where $\{a_i, 0 \leq i \leq N\}$ are a set of coefficients, the coefficients $a_i$ that minimize the total squared error $$e^2 = \sum_{\pi_0} (f(x) - g(x))^2$$

are given by $$a_i = \frac{\Sigma_{\pi_0} f(X) S_i(X)}{\Sigma_{\pi_0} S_i^2(X)} \quad (4)$$

Let the picture function $f(x)$ be written as $$f(X) = \sum_{i=0}^{N} \alpha_i S_i(X) + \eta(X) \quad (5)$$

where $\eta(x)$ is a noise term and is assumed to be Gaussian with zero mean and variance $\sigma^2$. The noise $\eta(x)$ is also assumed to be independent from pixel to pixel. Then we have $$a_i = \alpha_i + \frac{\Sigma_{\pi_0} \eta(X) S_i(X)}{\Sigma_{\pi_0} S_i^2(X)} \quad (6)$$

The coefficient $a_i$ are unbiased and independent and their variances are given by $$\text{var}(a_i) = \frac{\sigma^2}{\sum_{\pi_0} S_i^2(X)} \quad (7)$$

The total squared error, $e^2$, is given by $$e^2 = \Sigma_X \eta^2(X) - \sum_{i=0}^{N} (a_i - \alpha_i)^2 \left( \sum_{\pi_0} S_i^2(X) \right) \quad (8)$$

Thus, the quantity $(e^2/\sigma^2)$ is distributed as a $\chi^2$ variate with $$\left[ \sum_{\pi_0} (l) - (N + 1) \right]$$

degrees of freedom. To test the hypothesis that the coefficients $a_{1i}$, $i = 1, 2, \ldots m(m < N)$ are in fact zero, we use the ratio $$F = \frac{\left[ \left( \sum_{i=1}^{m} a_{1i}^2 (\Sigma_X S_{ii}^2(X)) \right) / m \right]}{\left[ e^2 / \left( \sum_{\pi_0} (l) - (N + 1) \right) \right]} \quad (9)$$

which has F-distribution with $$\left( m, \left[ \sum_{\pi_0} (l) - (N + 1) \right] \right)$$

degrees of freedom and reject the hypothesis for large values of F.

By choosing the orthogonal polynomials as the basis functions, the coefficients for the following hyperquadric surface fit to the picture function in three-dimensions can be obtained as follows:

$$g(X_1, X_2, X_3) = b_0 + \sum_{i=1}^{3} b_i X_i + \sum_{i=1}^{3} b_{ii} X_i^2 + \sum_{\substack{i,j=1 \\ i<j}}^{3} b_{ij} X_i X_j \quad (10)$$

The estimates of the coefficients are given by:

$$b_i = \frac{\sum_{\pi_0} f(X)X_i}{\sum_{\pi_0} X_i^2} = \frac{bN_i}{bD_i} \quad (11)$$

$$b_{ii} = \frac{\sum_{\pi_0} f(X)(P_{i2}(X_i))}{\sum_{\pi_0} (P_{i2}^2(X_i))} = \frac{bN_{ii}}{bD_{ii}}$$

$$b_{ij} = \frac{\sum_{\pi_0} f(X) X_i X_j}{\sum_{\pi_0} (X_i X_j)^2} = \frac{bN_{ij}}{bD_{ij}}$$

$$b_0 = \frac{\sum_{\pi_0} f(X)}{\sum_{\pi_0} (1)} - \sum_{i=1}^{3} \frac{\mu_{i2}}{\mu_{i0}} b_{ii}$$

$$P_{i2}(X_i) = \left(X_i^2 - \frac{\mu_{i2}}{\mu_{i0}}\right) \text{ and } \mu_{ik} = \sum_{\pi_0} X_i^k$$

If the coordinate system is rotated by using an orthonormal rotation matrix D, the coordinates X in the original and the coordinates Y in the rotated coordinate system are related as X=DY which is equal to the summation between the limits of j being 1 and 3 for the quantity $(d_{ij}y_j)$.

The fitted function g(Y) can be expressed with respect to the rotated coordinates as $$g(Y) = C_0 + \sum_{i=1}^{3} C_i Y_i + \sum_{i=1}^{3} C_{ii} Y_i^2 + \sum_{\substack{i,j=1 \\ i<j}}^{3} C_{ij} Y_i Y_j \quad (12)$$

The coefficients b's and c's are related in terms of the elements of the rotating matrix D as follows:

$$C_0 = b_0 \quad (13)$$

$$C_i = \sum_{l=1}^{3} b_l d_{li}, \; 1 \leq i \leq 3$$

$$C_{ii} = \sum_{l=1}^{3} b_{ll} d_{li}^2 + \sum_{\substack{l,m=1 \\ l<m}}^{3} b_{lm} d_{li} d_{mi}, \; 1 \leq i \leq 3$$

$$C_{ij} = 2\sum_{l=1}^{3} b_{ll} d_{li} d_{lj} + \sum_{\substack{l,m=1 \\ l<m}}^{3} b_{lm}(d_{li}d_{mj} + d_{lj}d_{mi}), \; 1 \leq i,j \leq 3$$

Expressions for the variances of $C_i$ and $C_{ii}$ are given in the following:

$$\text{var}(C_i) = \sigma^2 \left[ \sum_{l=1}^{3} d_{li}^2 \frac{1}{(\sum_{\pi_0} X_l^2)} \right] \quad (14)$$

$$\text{var}(C_{ii}) = \sigma^2 \left[ \sum_{l=1}^{3} d_{li}^4 \frac{1}{\sum_{\pi_0} P_{i2}^2(X_l)} + \sum_{\substack{l,m=1 \\ l<m}}^{3} d_{li}^2 d_{mi}^2 \frac{1}{\sum_{\pi_0}(X_l X_m)^2} \right]$$

The sum of squares of errors of the fitted surface is independent of rotation in the coordinate system. A step edge and its derivatives are shown in the graphs of FIG. 6 to illustrate proof of an edge if the following conditions are satisfied: (a) the gradient in a direction normal to the direction of the edge is significantly different from zero; and, (b) the second directional derivative in the direction of the gradient is significantly zero. Thus, relative to a median point 64 of curve 66 of f(x), the first derivative at point 68 is significantly greater than zero and the second derivative curve at point 70 is significantly zero.

In like manner, tests of significance are executed for proof of a roof top edge or line. As shown in FIG. 7, such a roof top edge is characterized by f(x) curve 72 peaking at top point 74 with the first derivative curve indicating significantly zero along line 76 at point 78 and the second derivative curve showing a significantly greater than zero value at point 80. In effect, it is stated that the line is detected by performing the significance test in a direction perpendicular to the direction of the line for (a) the zeroness of the gradient; and, (b) the non-zeroness of the second derivative.

For the detection of edges and lines in the $X_1$-$X_2$ plane, the coordinate system is rotated as shown, for example, in FIG. 8. Thus, the original coordinate system $X_1$-$X_2$ is rotated counter-clockwise by a selected angle $\theta$ to set up the coordinate system $Y_1$-$Y_2$. The rotation of the coordinate system and the D-matrix may be represented as follows:

$$X_1 = y_1 \cos\theta - y_2 \sin\theta \quad (15)$$
$$X_2 = y_1 \sin\theta + y_2 \cos\theta$$
$$X_3 = y_3$$
$$X = DY$$

$$D = \begin{bmatrix} \cos\theta & -\sin\theta & 0 \\ \sin\theta & \cos\theta & 0 \\ 0 & 0 & 1 \end{bmatrix}$$

Thus, the directional derivative of the fitted function g in the direction $Y_1$ is given by $$\frac{\partial g}{\partial y_1} = \frac{\partial g}{\partial X_1} \cos\theta + \frac{\partial g}{\partial X_2} \sin\theta \quad (16)$$

The angle $\theta$ that maximizes the direction derivative is given by $$\frac{\partial}{\partial \theta}\left(\frac{\partial g}{\partial y_1}\right) = -\frac{\partial g}{\partial X_1}\sin\theta + \frac{\partial g}{\partial X_2}\cos\theta = 0 \quad (17)$$

or $$\theta_G = \text{Tan}^{-1}\left(\frac{\partial g}{\partial X_2} \bigg/ \frac{\partial g}{\partial X_1}\right)$$

For computing the direction of the line, the second directional derivative in the $Y_1$ direction is given by $$\frac{\partial^2 g}{\partial y_1^2} = \frac{\partial^2 g}{\partial X_1^2}\cos^2\theta + \frac{\partial^2 g}{\partial X_1 \partial X_2} 2\cos\theta\sin\theta + \frac{\partial^2 g}{\partial X_2^2}\sin^2\theta \quad (18)$$

The direction of the line is determined from $$\frac{\partial}{\partial \theta}\left(\frac{\partial^2 g}{\partial y_1^2}\right) = 0 \tag{19}$$

or $$\theta_L = \frac{1}{2} \text{Tan}^{-1}\left[2\frac{\partial^2 g}{\partial X_1 \partial X_2} \middle/ \left(\frac{\partial^2 g}{\partial X_1^2} - \frac{\partial^2 g}{\partial X_2^2}\right)\right]$$

All necessary variables having been determined and stored, computation then proceeds to declare $bN_i$, $bN_{ii}$, $bN_{ij}$, $bN_o$ and $b_i$, $b_{ii}$, $b_{ij}$, $b_o$ as derived previously at equations (11). The computations of flow step 62 performing tests of significance carry out computation of $\theta_G$ and $\theta_L$. Thus, it computes the coefficients $C_1$ and $C_{11}$ with the rotation matrix corresponding to $\theta_G$; and, there are then formed values $F_{e1}$ and $F_{e2}$ where $$F_{e1} = \frac{C_1^2 | \text{var }(C_1)}{e^2 | (\text{deg. of freedom } e^2)} \tag{20}$$

$$F_{e2} = \frac{C_{11}^2 | \text{var }(C_{11})}{e^2 | (\text{deg. of freedom } e^2)}$$

Then, letting $F_{e1c}$ and $F_{e2c}$ represent the critical values for $F_{e1}$ and $F_{e2}$, declare there is an edge if $F_{e1}$ is greater than $F_{e1c}$ and $F_{e2}$ is less than $F_{e2c}$. If there is proof of an edge, the program stores the gradient magnitude and direction for the pixel under consideration.

The next operation is to compute the coefficients $C_1$ and $C_{11}$ with the rotation matrix corresponding to $\theta_L$. Thus, in similar manner, there is formed the values $F_{L1}$ and $F_{L2}$ where $$F_{L1} = \frac{C_1^2 | \text{var }(C_1)}{e^2 | (\text{deg. of freedom } e^2)} \tag{21}$$

and $$F_{L2} = \frac{C_{11}^2 | \text{var }(C_{11})}{e^2 | (\text{deg. of freedom } e^2)}$$

Letting $F_{L1C}$ and $F_{L2C}$ represent the critical values for $F_{L1}$ and $F_{L2}$, the program then declares there to be a line if $F_{L1}$ is less than $F_{L1C}$ and $F_{L2}$ is greater than $F_{L2C}$. If there is a line proven, then the magnitude and direction for the pixel under consideration is stored. Similar tests may be performed for the detection of edge and line at any arbitrary direction $\theta$, if desired.

Upon performance of the test for significance for the first neighborhood in stage 62, flow proceeds to a query stage 82 to determine whether or not this is the last neighborhood to be examined and, if not, the program recycles to operation of flow stage 84 to consider the next succeeding neighborhood in the $X_2$ direction. The flow stage 86 then performs a recursive relationship operation to compute the coefficients of the current neighborhoods fitted function by updating as operation recycles through the significance testing stage 62 for the next or current neighborhood processing. The function of the recursive and computative stage 86 sets the size of the neighborhood in the $X_2$ coordinate direction so that if $N_2$ is odd, then $N_{2\,2}$ is equal to $N_2|2$ and is truncated to an integer value (e.g. if $N_2=5$, then $N_{22}=2$). $N2I$ then sets the starting value of $X_2$ of the current neighborhood and there is definition as follows:

$$II = N2I - 1 \tag{22}$$

$$IL = II + N_2$$

$$N221 = N_2 + 1$$

$$X120 = \frac{\mu12}{\mu10}$$

$$X320 = \frac{\mu32}{\mu30}$$

$$PNW1 = \frac{\mu22}{\mu20} - 2\,N22 - 1.0 - N22^2,$$

$$PNW2 = N22^2 - \frac{\mu22}{\mu20}$$

$$FIL1 = -F1(II, 1) + F1(ILL, 1)$$

Updating the numerators of the coefficients b's is as follows:

$$bN_{12} = bN_{12} - bN_1 + N221 \cdot F1(II,2) + N22 \cdot F1(ILL,2)$$

$$bN_{13} = bN_{13} - F1(II,6) + F1(ILL, 6)$$

$$bN_{23} = bN_{23} - bN_3 + N221 \cdot F1(II,3) + N22 \cdot F1(ILL,3)$$

$$bN_{11} = bN_{11} - F1(II,4) + F1(ILL,4) - X120 \cdot FIL1$$

$$bN_{22} = bN_{22} - 2.0\,bN_2 + bN_0 + PNW1\,F1(II,1) + PNW2\,F1(ILL,1)$$

$$bn_{33} = bN_{33} - F1(II,5) + F1(ILL,5) - X320\,FIL1$$

$$bN_1 = bN_1 - F1(II,2) + F1(ILL,2)$$

$$bN_2 = bN_2 - bN_0 + N221\,F1(II,1) + N22\,F1(ILL,1)$$

$$bN_3 = bN_3 - F1(II,3) + F1(ILL,3)$$

$$bN_0 = bN_0 + FIL1 \tag{23}$$

The program then effects computation of the values $b_i$, $b_{ii}$, $b_{ij}$ and $b_o$ in accordance with equations (11) as the current neighborhood data is stored subject to significance tests for edge or line presence. All successive neighborhoods in the $X_2$ direction are processed for computational coefficients and performance of tests of significance for edge and line detection until the decision stage 82 finds an affirmative for the last neighborhood in the $X_2$ direction, whereupon the program moves forward to a decision stage 88 for query as to whether or not the last line of the data has been read in the $X_1$ direction. If not, flow proceeds to stage 90 which reads from storage the next line of data of size $m_2 \times N_3$, and flow stage 92 forms a current set of $N_1$ lines and computes their parameters by recursive update. The new set of lines in the $N_1$ dimension must then be processed through the successive neighborhoods from the first through the last. Thus, the program recycles back through flow stage 58 to consider the first neighborhood of the next successive set of $N_1$ lines.

In operation, the flow stage 92 transfers the last $N_1 - 1$ lines of size $m_2 \times 3$ of $F2(X_1, X_2, X_3)$ into the first $N_1 - 1$ lines. That is, $F2(i, X_2, X_3) = F2(i+1, X_2, X_3)$ for $1 \leq i \leq N_1 - 1$. Using the currently read line of data there is computed $F2\,(N_1, X_2, X_3)$ for $1 \leq X_2 \leq m_2$ and $1 \leq X_3 \leq X_3 \leq 3$. Letting FC $(X_2, X_3)$, $1 \leq X_2 \leq m_2$, $1 \leq X_3 \leq N_3$, be equal to the currently read line of data, and let $\pi_3$ be the domain of $X_3$. Then, for every $X_2$ compute the following:

$$F3(X_2,1) = \sum_{\pi_3} FC(X_2, X_3) \qquad (24)$$

$$F3(X_2,2) = \sum_{\pi_3} X_3 \, FC(X_2, X_3)$$

$$F3(X_2,3) = \sum_{\pi_3} X_3^2 \, FC(X_2, X_3)$$

Let the size of the neighborhood $N_1$ in the $X_1$ coordinate direction be odd, and let $N12 = N1|2$ and be truncated to an integer value, and let $N121 = N12 + 1$; then, the parameters of the current set of lines F1's are updated as follows:

$$F1(X_2,6) = F1(X_2,6) - F1(X_2,3) + N121$$
$$F2(1,X_2,2) + N12 \, F3(X_2,2)$$

$$F1(X_2,5) = F1(X_2,5) - F2(1,X_2,3) + F3(X_2,3)$$

$$F1(X_2,4) = F1(X_2,4) - 2$$
$$F1(X_2,2) + F1(X_2,1) - N121^2 F2(1,X_2,1) + N12^2 F3(-X_2,1)$$

$$F1(X_2,3) = F1(X_2,3) - F2(1,X_2,2) + F3(X_2,2)$$

$$F1(X_2,2) = F1(X_2,2) - F1(X_2,1) + N121$$
$$F2(1,X_2,1) + N12 \, F3(X_2,1)$$

$$F1(X_2,1) = F1(X_2,1) - F2(1,X_2,1) + F3(X_2,1) \qquad (25).$$

After processing of all neighborhoods in the $X_2$ direction successively for all times in the $X_1$ direction, i.e. a complete neighborhood coverage of the image, all edge and line data is computed, tested for significance and stored. When the last of the data has been read, the decision stage 88 signals an affirmative and data processing proceeds to flow stage 94 which effects thinning of detected edges and lines. In flow stage 94, the direction normal to the direction of an edge or line is quantized into one of eight directions as shown in FIG. 9. Thus, the edges (lines) at the neighboring pixels in a direction normal to the directions of edge (line) of the pixel under consideration, i.e. the central pixel, are disqualified from being candidates for edge (line) if the following conditions are satisfied: (1) the edge (line) magnitude of the pixel under consideration is larger than the edge (line) magnitude of the neighboring pixels; and, (2) the direction of the edge (line) of the neighboring pixels is approximately the same as the direction of the edge (line) of the pixel under consideration.

After thinning at flow stage 94, operation proceeds to a link flow stage 96 which may be used to perform the final data operations prior to end 98 and display output of the finished image. The link stage 96 functions to quantize the measured edge (line) direction at each pixel of the thinned edge (line) image where the edge (line) magnitude is not equal to zero into one of eight directions. Because of thinning there will not be an edge (line) at both of the neighboring pixels in a direction normal to the direction of the edge (line). Using this property, the function is to link the edges (lines) that are separated by a pre-specified threshold on consecutive lines in the direction of the edge (line).

The photo-reproductions of FIGS. 10 through 16 illustrate final display results of image analysis performed with processing system 20. FIGS. 10, 11, 12 and 13 represent Landsat data for Landsat bands 4, 5, 6 and 7, respectively, as scanned over an area in Australia from an altitude of 250 miles. The Landsat band response designations are as follows:

Landsat Band 4—0.5 to 0.6 microns
Landsat Band 5—0.6 to 0.7 microns
Landsat Band 6—0.7 to 0.8 microns
Landsat Band 7—0.8 to 1.1 microns.

Figure 14:
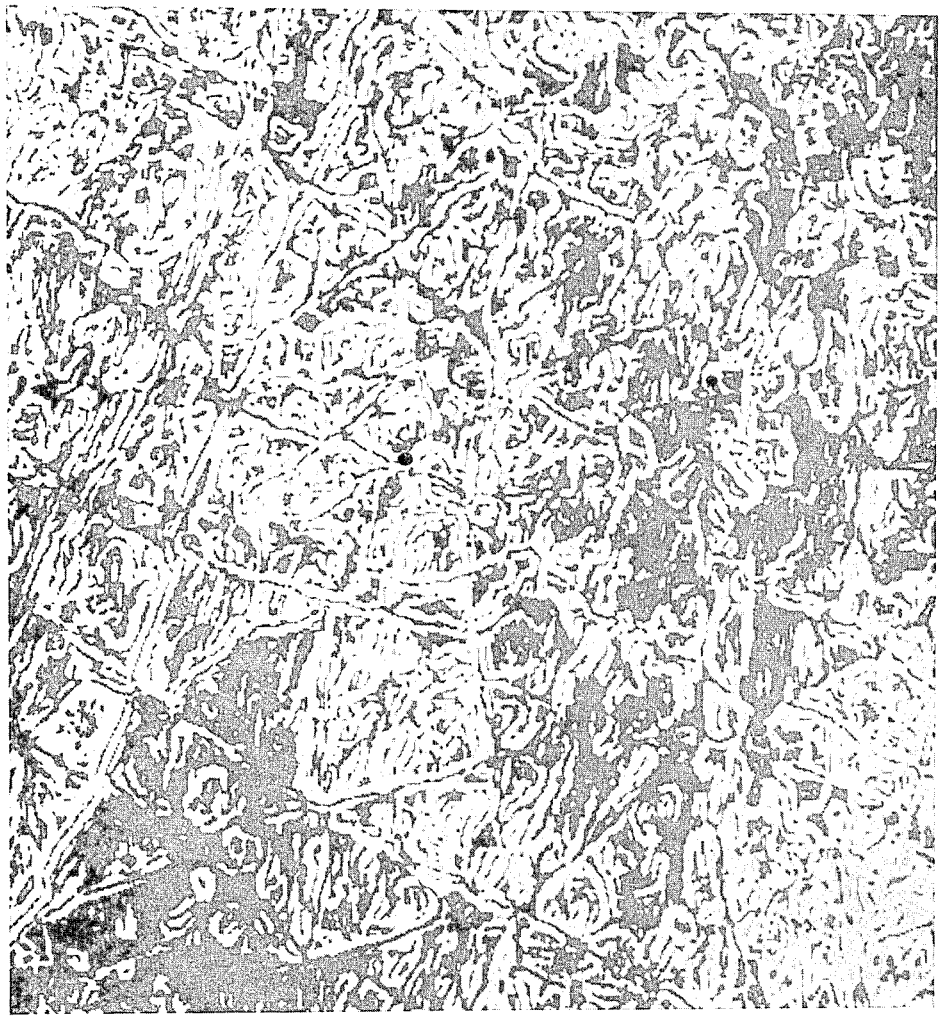
FIG. 14 is a gradient magnitude image of detected significant lines thresholded at a high percentage confidence level.
Figure 19:
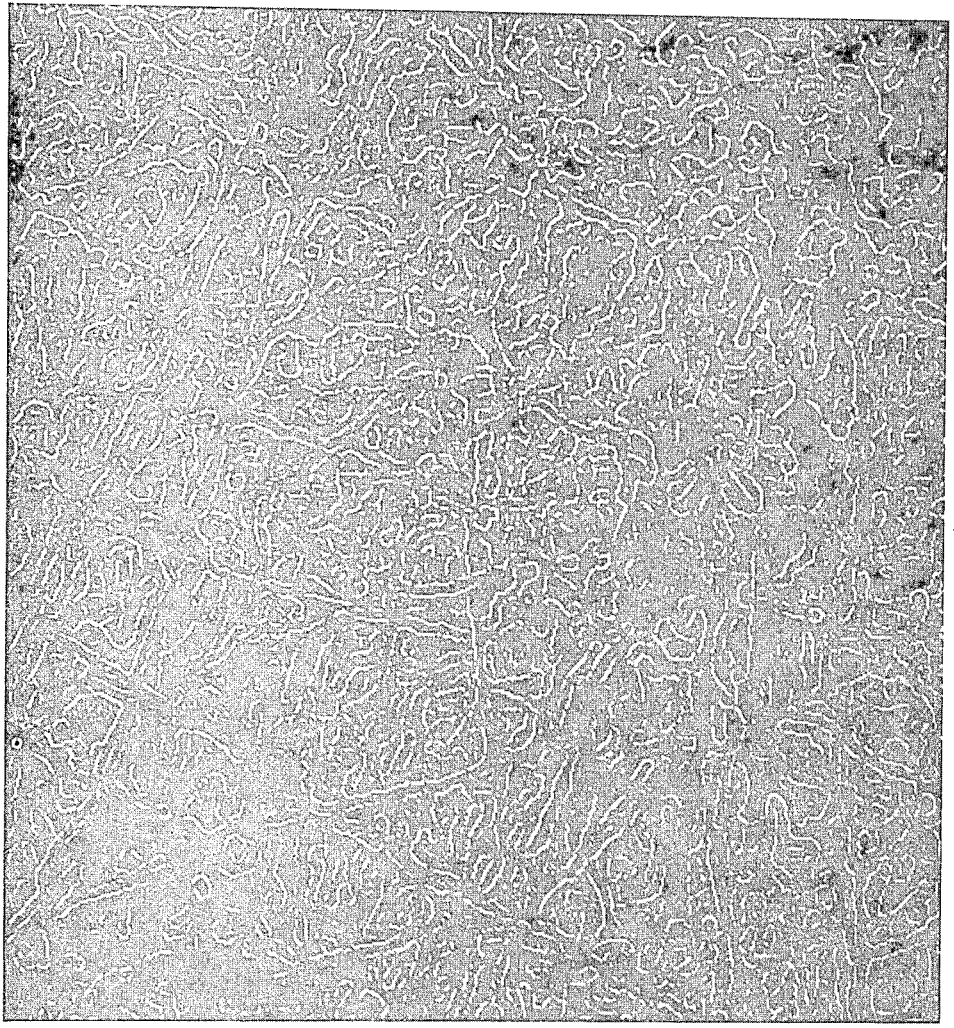
Figure 16:
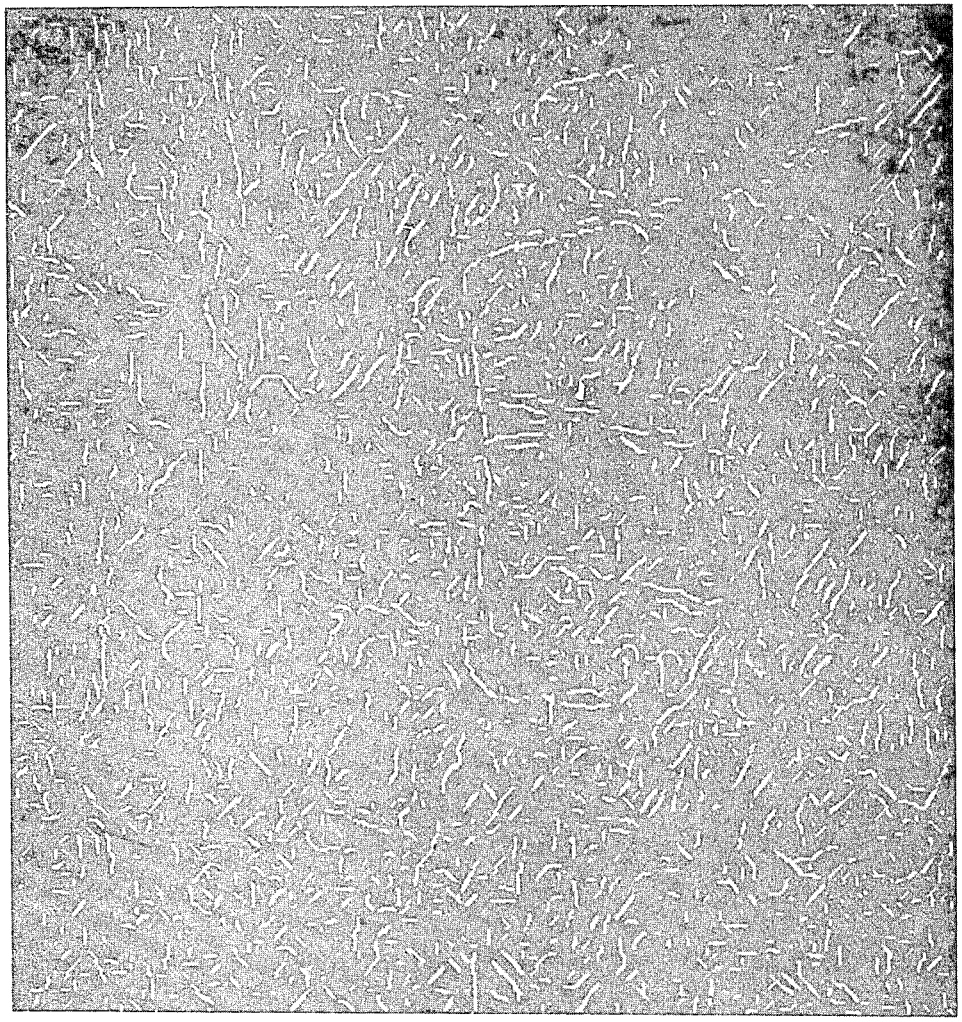
FIG. 16 is a further thinned image at increased line significance factor of that data which is depicted in FIG. 15.

The multi-band Landsat data or the multi-dimensional portion $N_3$ of an image $m_1 \times m_2 \times N_3$, was processed in accordance with the system 20. FIG. 14 is a final output display of a gradient magnitude image. The gradient magnitude image was processed with threshold set at a high percent confidence level, e.g. 95% confidence level, and it can readily be seen that many significant lineaments in many different directions are highlighted in the display. The alignments, continuances, cross-overs and diverse linear patterns are presented in enhanced form that is not readily discernible in the one or more raw data band images of FIGS. 10–13. Further processing to thin the edges of the line is apparent in the output display of FIG. 15, a gradient magnitude image that has been both thinned and thresholded. Finally, FIG. 16 illustrates a gradient magnitude image which is still further linked to illustrate certain prominent highlights surviving the process test.

The foregoing discloses a novel method for edge and line detection of multidimensional image data utilizing machine processing. The method of the present invention is particularly valuable in defining edge and line formation within noisey image data as the process functions to define edge and line magnitude and orientation and allows further steps of thinning and linking in tomographic manner.

While the machine process of the present invention is particularly set forth in terms of specific steps and data processing manipulations, it should be understood that similar processing functions obtaining the same general results can be implemented without departing from the spirit and scope of the invention as defined in the following claims.

The embodiments of the invention in which an exclusive property or privilege is claimed are defined as follows:

1. A machine process for analysis of multidimensional data for detection of edge and line distinctions, comprising the steps of:
   inputting multidimensional digital image data of line dimension $m_1 \times m_2 \times N_3$ wherein $m_1$ and $m_2$ are the horizontal coordinate values of a rectangular pixel array and $N_3$ is the respective vertical coordinate value;
   compute parameters for image values for a selected $N_1$ of said $m_1$ lines of data of size $m_2 \times N_3$ and determine denominators of coefficients for a fitting hyper surface wherein $N_1 \times N_2 \times N_3$ defines a selected neighborhood of multidimensional pixels within the coordinates $m_1 \times m_2 \times N_3$;
   examine a first pixel neighborhood of data of $N_1 \times N_2 \times N_3$ dimension and compute coefficients of the fitting hypersurface;
   continue examining and computing said coefficients of the fitting hypersurface for successive, overlapping pixel neighborhoods of $N_1 \times N_2 \times N_3$ across lines $N_1$ and successively through all sequential lines $N_1$ of said $m_1$ lines of data;

perform tests for significance of magnitude and direction of each successive pixel neighborhood $N_1 \times N_2 \times N_3$ to derive edge and line data; and outputting a visual display of selected edge and line data.

2. A machine process as set forth in claim 1 wherein: said input image data is selected Landsat scan data in a plurality of spectral response data representations.

3. A machine process as set forth in claim 1 wherein: said input image data is three-dimensional seismic energy data.

4. A machine process as set forth in claim 1 wherein: said computation of coefficients of the fitting hypersurface accounts for Gaussian noise.

5. A machine process as set forth in claim 1 wherein: said fitting hypersurface is a hyperquadric surface.

6. A machine process as set forth in claim 5 wherein said step of performing tests for significance comprises: rotating the coefficient data for each neighborhood by a selected angle and comparing the coefficient data and rotated coefficient data for zeroness and non-zeroness to prove edge and line data values and orientation.

* * * * *